US006609655B1

(12) United States Patent
Harrell

(10) Patent No.: US 6,609,655 B1
(45) Date of Patent: Aug. 26, 2003

(54) SMART CARD SYSTEM FOR PROVIDING FINANCIAL, TRAVEL, AND ENTERTAINMENT-RELATED SERVICES

(76) Inventor: Martha F. Harrell, 4228 Seminary Ave., Richmond, VA (US) 23227

( * ) Notice: Subject to any disclaimer, the term of this patent is extended or adjusted under 35 U.S.C. 154(b) by 0 days.

(21) Appl. No.: 09/604,117

(22) Filed: Jun. 26, 2000

(51) Int. Cl.[7] .................................................. G06K 5/00

(52) U.S. Cl. ....................... 235/380; 235/375; 235/376; 235/382; 235/383; 705/13; 705/14

(58) Field of Search ................................ 235/375, 376, 235/378, 382, 383, 384; 705/13, 14

(56) References Cited

U.S. PATENT DOCUMENTS 4,963,723 A * 10/1990 Masada ...................... 235/384
5,310,999 A * 5/1994 Claus et al. ................ 235/384
5,424,727 A 6/1995 Shieh
5,451,758 A 9/1995 Jesadanont
5,485,520 A 1/1996 Chaum et al.
5,530,232 A * 6/1996 Taylor ........................ 235/380
5,594,233 A * 1/1997 Kenneth et al. ............ 235/492
5,602,375 A 2/1997 Sunahara et al.
5,604,342 A 2/1997 Fujioka
5,819,234 A * 10/1998 Slavin et al. ................. 705/13
5,825,007 A 10/1998 Jesadanont
6,246,985 B1 * 6/2001 Kanevsky et al. .......... 704/270
6,252,952 B1 * 6/2001 Kung et al. ................. 379/114
6,263,316 B1 * 7/2001 Khan et al. .................. 705/13

* cited by examiner

*Primary Examiner*—Michael G. Lee
*Assistant Examiner*—Seung Ho Lee
(74) *Attorney, Agent, or Firm*—Hunton & Williams

(57) ABSTRACT

A smart card system for providing travel-and entertainment-related resources and associated methods is provided. The smart card system includes a smart card payment processing facility for communicating with the smart card for automated payments of fares and/or fees and/or tolls. The smart card comprises a contactless and a contact interface for collecting payments for travel-and entertainment-related functions. The smart card system may be used to pay other types of travel and entertainment charges, such as airline fares, bus fares, entertainment park entrance fees and parking fees. The card may further include tools for purchasing travel-and entertainment-related products.

28 Claims, 5 Drawing Sheets

SMART CARD SYSTEM FOR PROVIDING FINANCIAL, TRAVEL, AND ENTERTAINMENT-RELATED SERVICES

FIELD OF THE INVENTION

The present application relates to smart cards for serving travel-related and entertainment-related functions, and in particular to smart cards useful in facilitating automatic fare, fee, and toll payment.

BACKGROUND OF THE INVENTION

Over the past several years, smart card technology has developed to overtake magnetic stripe-only technology for many applications. Smart cards are generally made to match the size of a credit card, but have an embedded microprocessor chip that allows for receipt, processing, storage, and transmission of information. The chip generally allows smart cards to store orders of magnitude times as much data as magnetic stripe technology.

In addition to the increased storage capacity, information stored on smart cards can be more readily secured than with magnetic stripe technology. Smart cards are not required to carry information, such as account numbers or names, on the face of the card. Smart cards can store electronic digital signatures or other security information which is invisible to the user. Also, smart cards may be useful to protect a user from having to transmit personal data such as credit card numbers. All data transmitted through smart card technology is encrypted. Through this capability, smart cards provide secure electronic commerce.

Several types of smart cards are now produced. Smart cards can be categorized according to their capabilities and their usage mode. First, with regard to capabilities, smart cards may either be (a) intelligent cards, or (b) memory cards. Intelligent cards or CPU cards contain a central processing unit (CPU) that has the ability to store and secure information, and make decisions. Memory cards are primarily information storage cards that do not process information.

With regard to usage mode, smart cards can either be used as (a) contact cards, or (b) contactless cards. The contact cards need to be inserted in a smart card reader, which touches a conductive module on the surface of the card in order to be read. The contactless card makes use of an electromagnetic signal and an antenna on each smart card for communication between the card and the card reader. Reading distances for contactless cards range from one inch to several feet in distance.

Two types of cards capable of operating in both contact and contactless modes have also been developed. Hybrid cards are dual chip cards in which each chip has a respective contact and contactiess interface, which are not connected to one another inside the card. Combi cards include a single chip that has both contact and contactless interfaces.

Several prior art systems have been employed to facilitate toll collection. The following are examples of the systems known in the art. U.S. Pat. No. 5,424,727 to Shieh discloses a method and system for two-way packet radio-based electronic toll collection. U.S. Pat. No. 5,451,758 to Jesadanont discloses a system for collecting tolls through the use of magnetic cards. U.S. Pat. No. 5,485,520 to Chaum et al. discloses a system for automatic real time highway toll collection from moving vehicles. U.S. Pat. No. 5,602,375 to Sunahara et al. discloses an automatic debiting system suitable for free lane traveling. U.S. Pat. No. 5,825,007 to Jesadanont discloses a method of paying tolls with pre-paid cards.

All of these systems suffer from various deficiencies. In particular, the cards employed have limited capabilities and can generally only be used for toll collection.

SUMMARY OF THE INVENTION

It is accordingly an object of the invention to provide a smart card system and method for providing a smart card for serving travel-related and entertainment-related functions.

A further object of the invention is to provide a smart card that facilitates automatic fare, fee and toll payment for such travel-related and entertainment-related functions.

Yet a further object of the invention is to provide a system and method for using a smart card with contact and contactless interfaces to pay fares, fees and tolls and a contact interface for obtaining information.

To achieve the foregoing objects, and in accordance with the purpose of the invention as embodied and broadly described herein, there is provided a smart card system for performing travel and entertainment-related functions. The system comprises a smart card automated payment means within the smart card for providing automated payment for at least one of fees, fares and tolls and an automated payment means within a payment facility for communicating with the smart card automated payment means to facilitate payment. The system additionally comprises storage means on the smart card and/or its host system for storing user identification information and available funds, and card transaction information and processing means for updating funds information on the smart card and its host systems. The system additionally comprises means on the smart card for interfacing with a source web site, wherein access to travel and entertainment payment records is provided on the source web site.

In another aspect of the invention, a smart card is provided for communicating with a payment central processing unit for facilitating automatic payment of at least one of fees, fares and tolls. The smart card comprises receiving means for receiving a wakeup signal and a payment amount from the payment central processing unit, storage means for storing user identification data and financial data, information transmission means for transmitting a user identification number and a card balance upon receipt of the wakeup signal, and processing means for processing the payment amount transmitted by the payment central processing unit.

In yet another aspect of the invention a smart card toll payment system is provided comprising a central toll payment processing unit, wherein in a steady state, the central toll payment processing unit emits a signal, the signal maintaining a steady state comprising a red light being illuminated and a toll gate being closed. The central toll payment processing facility comprises infrared transmission means. The smart card toll payment system also comprises a smart card positioned within a vehicle that interrupts the signal, the smart card including storage means for storing user identification and account balance data, processing means for updating account balance data, and transmission and reception means for communicating with the central toll payment processing unit. Upon triggering of an interrupt, the central toll payment processing unit wakes up the smart card, receives smart card data, sends a payment amount, and when the payment amount is satisfied, activates a green light and raises the toll gate.

In yet another aspect, the invention provides a smart card system for performing travel and entertainment-related functions. The system comprises a smart card automated payment means within a smart card for providing for payment of at least one of fares, fees and tolls for the travel- and entertainment-related functions; an automated payment and an automated payment facility for communicating with the smart card automated payment means to facilitate automated payment. The system additionally comprises storage means on the smart card and/or its host system for storing user identification, available funds and card transaction information; and processing means on the smart card for updating financial information on the smart card and its host system (s). The smart card automated payment means includes contactiess means and contact means for collecting payments for airlines, buses and other travel- and entertainment-related functions.

In still another aspect, the invention provides a method for collecting payments of at least one of fare, fees and tolls with a payment system comprising a smart card and a payment facility processing unit. The method comprises the steps of creating a steady state condition in which the smart card is in a low power state and the payment facility processing unit is in a wait state and wherein when a photodetector beam is emitted, a red light is activated, and a gate is down. The method further comprises triggering an interrupt when a vehicle breaks the photodetector beam; and transmitting a signal from the, payment facility processing unit to the smart card to wake up the smart card. The invention also comprises transmitting identification and balance information from the smart card to the payment facility processing unit and processing the transmitted information and assessing a payment amount. After assessing the payment amount, the payment amount is transmitted to the smart card and subtracted from an initial amount stored within the smart card. The invention further comprises transmitting a verification signal from the smart card to the payment facility processing unit and activating a green light and raising the gate upon receiving the verification signal at the payment facility processing unit.

These and other features, objects, and advantages of the preferred embodiments will become apparent when the detailed description of the preferred embodiments is read in conjunction with the drawings attached hereto.

DETAILED DESCRIPTION OF THE PREFERRED EMBODIMENTS

Figure 1:
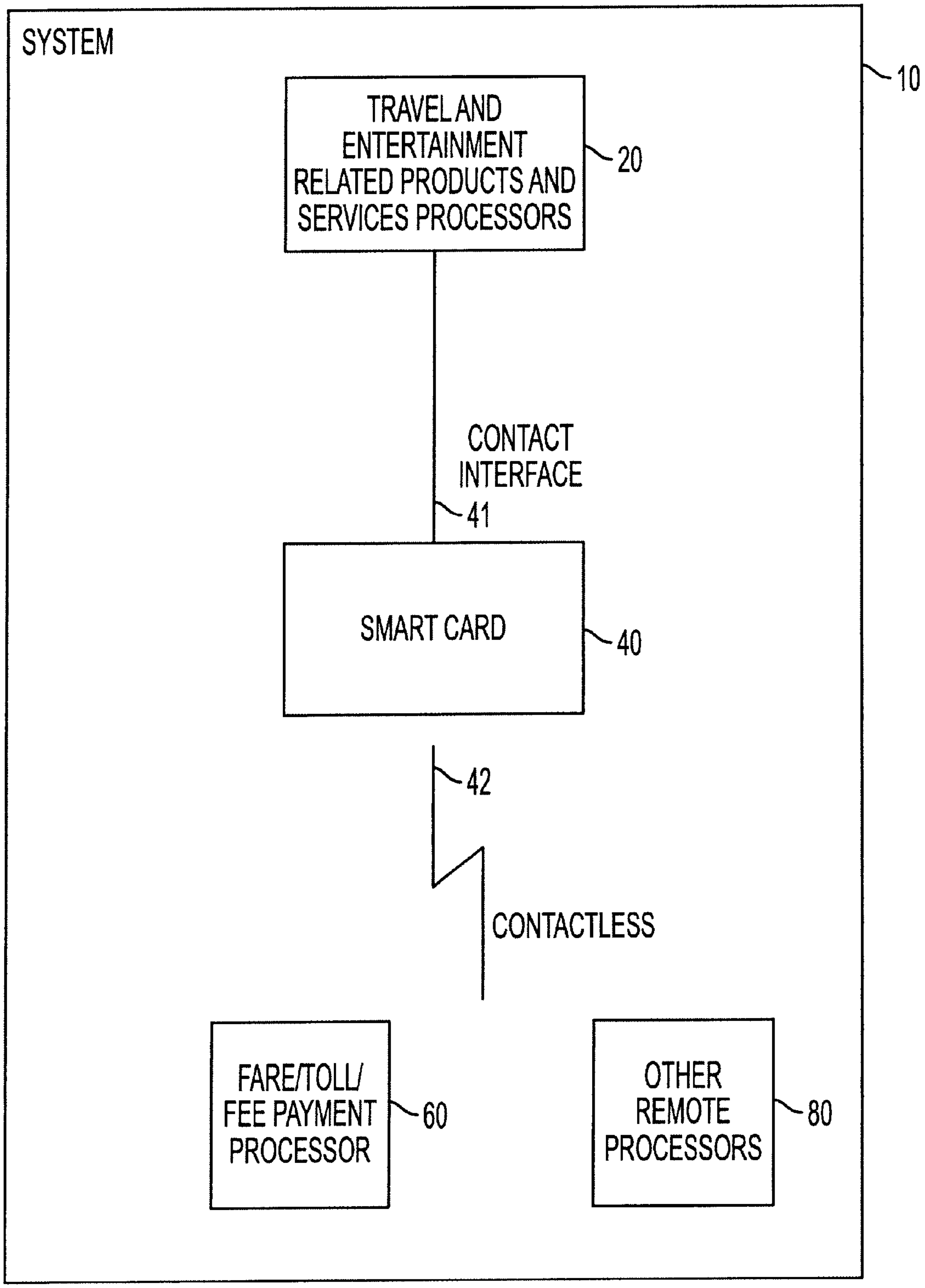
FIG. 1 is a block diagram illustrating the system for providing travel- and entertainment-related services.

Reference will now be made in detail to the present preferred embodiments of the invention, examples of which are illustrated in the accompanying drawings in which like reference numerals refer to corresponding elements.

FIG. 1 is a block diagram illustrating an embodiment of a smart card 40 system 10 for travel-and entertainment-related services. The system 10 comprises a smart card 40, which preferably includes a contact interface 41 and a contactless interface 42. The details of these interfaces will be described in greater detail with reference to FIG. 2. Through the use of the contactless interface 42, the smart card 40 is preferably able to communicate with a payment processor 60 and other remote processors 80. Through the use of contact interface 41, the smart card 40 communicates with other remote processors 80 that dispense travel- and entertainment-related services, information, and/or products. The smart card 40 interfaces through contact interface 41 with other travel-and entertainment-related products and services processors 20.

Figure 2:
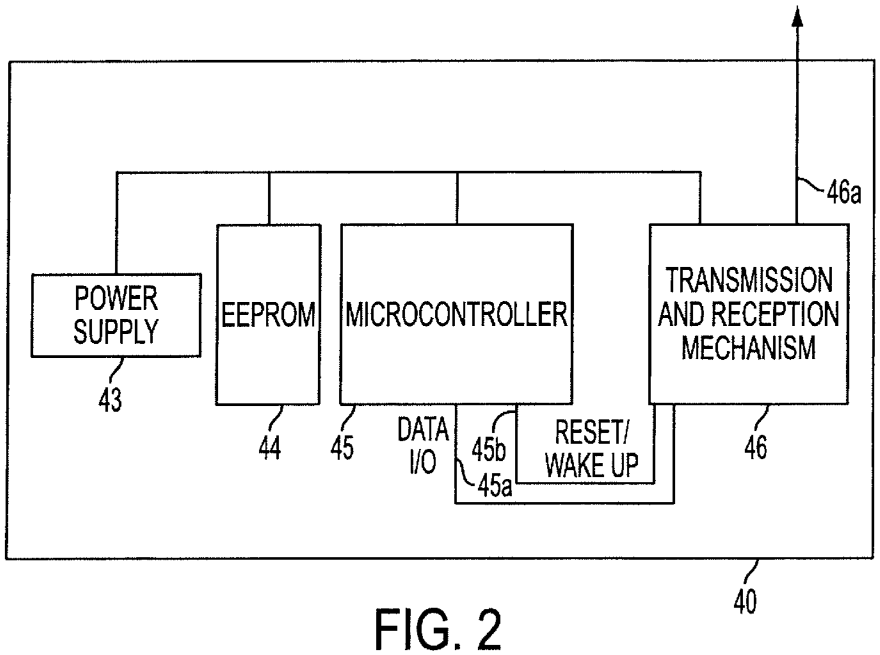
FIG. 2 is a block diagram illustrating an embodiment of the smart card of the invention.

FIG. 2 illustrates additional details of the smart card 40. The smart card 40 is of the intelligent type including a microcontroller 45 for processing. In one preferred embodiment, the microcontroller is a microchip PIC processor having a reduced instruction set computer (RISC) architecture. An electrically erasable programmable read only memory (EEPROM) 44 stores user identification data and account data on the smart card 40. A transmission/reception mechanism 46 communicates with external processors such as the payment processor 60. The smart card 40 is powered by power supply 43, which in a preferred embodiment comprises a lithium cell. Microcontroller 45 preferably includes a contact interface such that the smart card 40 can be read through direct insertion into a smart card 40 reader. Alternatively, the smart card 40 could be provided with a magnetic stripe for providing a contact interface 41. The data I/O connection 45*a* and reset/wakeup connection 45*b* function in conjunction with contactless interface 42 to receive data and bring the smart card 40 from a low power state to an operating state as will be explained in greater detail with respect to the method of the invention.

In a first preferred embodiment of the apparatus of FIG. 2, an infrared smart card 40 is provided. The contactless interface 42 preferably operates with a transmission/reception mechanism 46 that comprises a light emitting diode (LED) for transmission and a phototransistor for detection. Using the aforementioned components, the smart card 40 should have an effective transmission/reception range of about twenty-five feet and a high power consumption of approximately 50 milliamps.

In a second preferred embodiment of the apparatus of FIG. 2, the transmission/reception mechanism comprises a micron microstamp communications engine integrated circuit that operates based on radio frequency (RF) communications. The preferred operating frequency is a 1.44 GHz Spread Spectrum Mode. Using the above-identified components, the effective transmission/reception range of the smart card 40 is approximately 40–60 feet. The smart card 40 will have a low power consumption of approximately five microamps in the low power state and 2 microamps during the operating state. A disadvantage of the second preferred embodiment is its higher overall cost.

Figure 3:
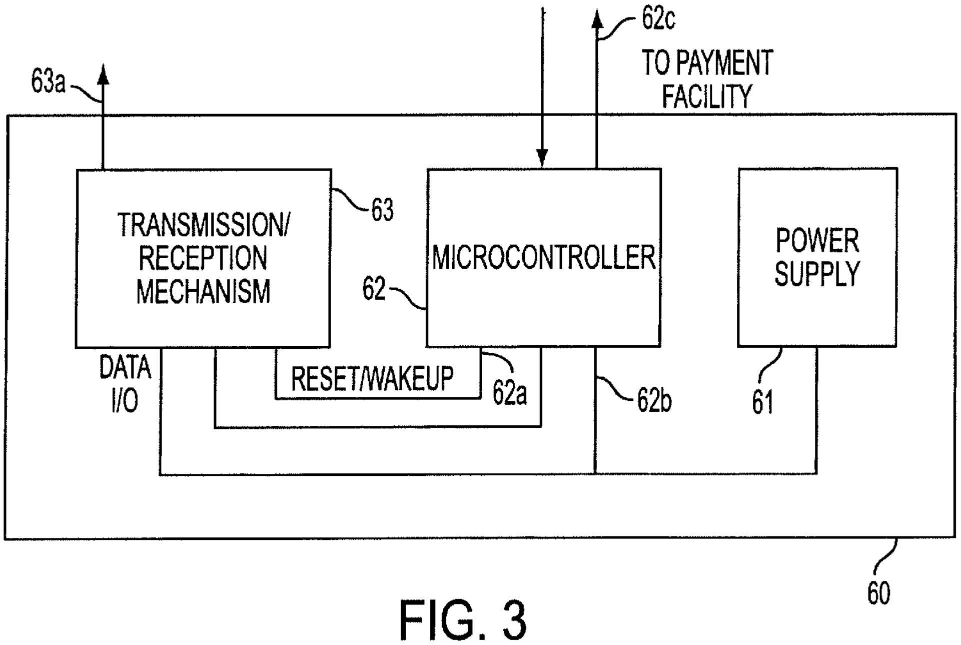
FIG. 3 is a block diagram illustrating the details of an embodiment of the payment central processing facility of the invention.

FIG. 3 illustrates the payment processor 60 to be used in connection with contactless interface 42. This embodiment is particularly directed to the payment processor 60 but can be adapted for other types of fare, fee or toll payment or processing. The payment processor 60 preferably comprises a microcontroller 62 that interfaces with a payment facility that may comprise toll gate through connection 62*c*. A transmission/reception mechanism 63 is provided for communicating through mechanism 63*a* with the smart card 40. The transmission/reception mechanism 63 transmits data between the smart card 40 and through data I/O connection 62*b* and operates to serve the reset and wakeup functions so as to convert from a wait or low power state to an operating state. The payment processor 60 is powered by power supply 61.

In the embodiment of the payment processor 60 corresponding to the first embodiment of the smart card 40, the payment processor 60 comprises an IR transmission and reception mechanism 46. In the second embodiment of the invention, the payment processor 60 comprises a transmission/reception mechanism that is an RF micron microstamp communications engine integrated circuit.

Figure 4:
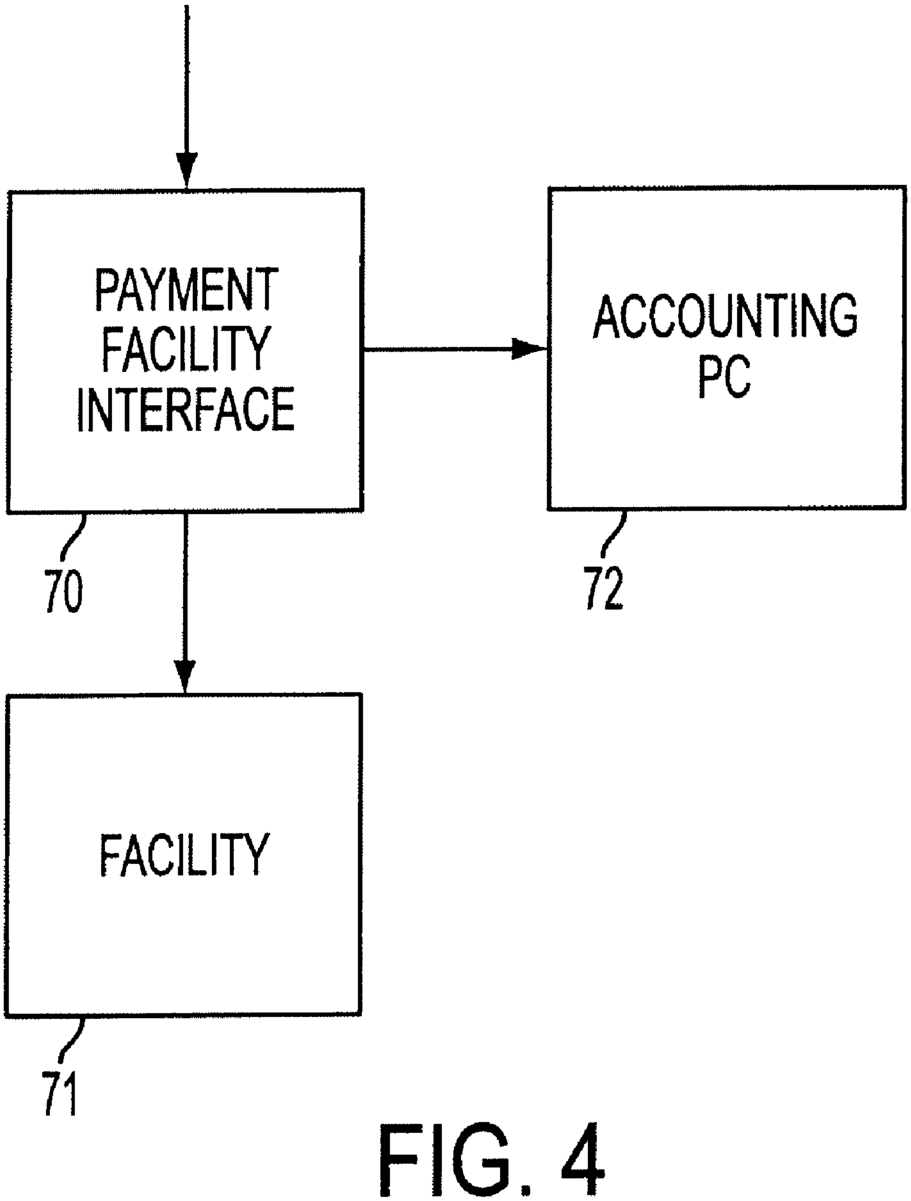
FIG. 4 is a block diagram illustrating components of the payment system associated with the payment central processing facility.

FIG. 4 illustrates an application in which the payment processor 60 is linked to a payment facility interface 70 that may comprise a toll gate interface. The payment facility interface 70 sends signals directly to facility 71 that may comprise a toll gate that can be raised and lowered. The payment facility interface 70 further connects with accounting processor 72, which is used to manage accounting for the toll gate system.

FIG. 1 also depicts the: contactless interface 42 communicating with other remote processors 80. Such remote processors 80 could include parking fee processors, airline fare processors or entertainment fee and/or fares and/or tolls processors. The smart card 40 could be linked with participating processors to pay predetermined fees for all of the aforementioned items.

Figure 5:
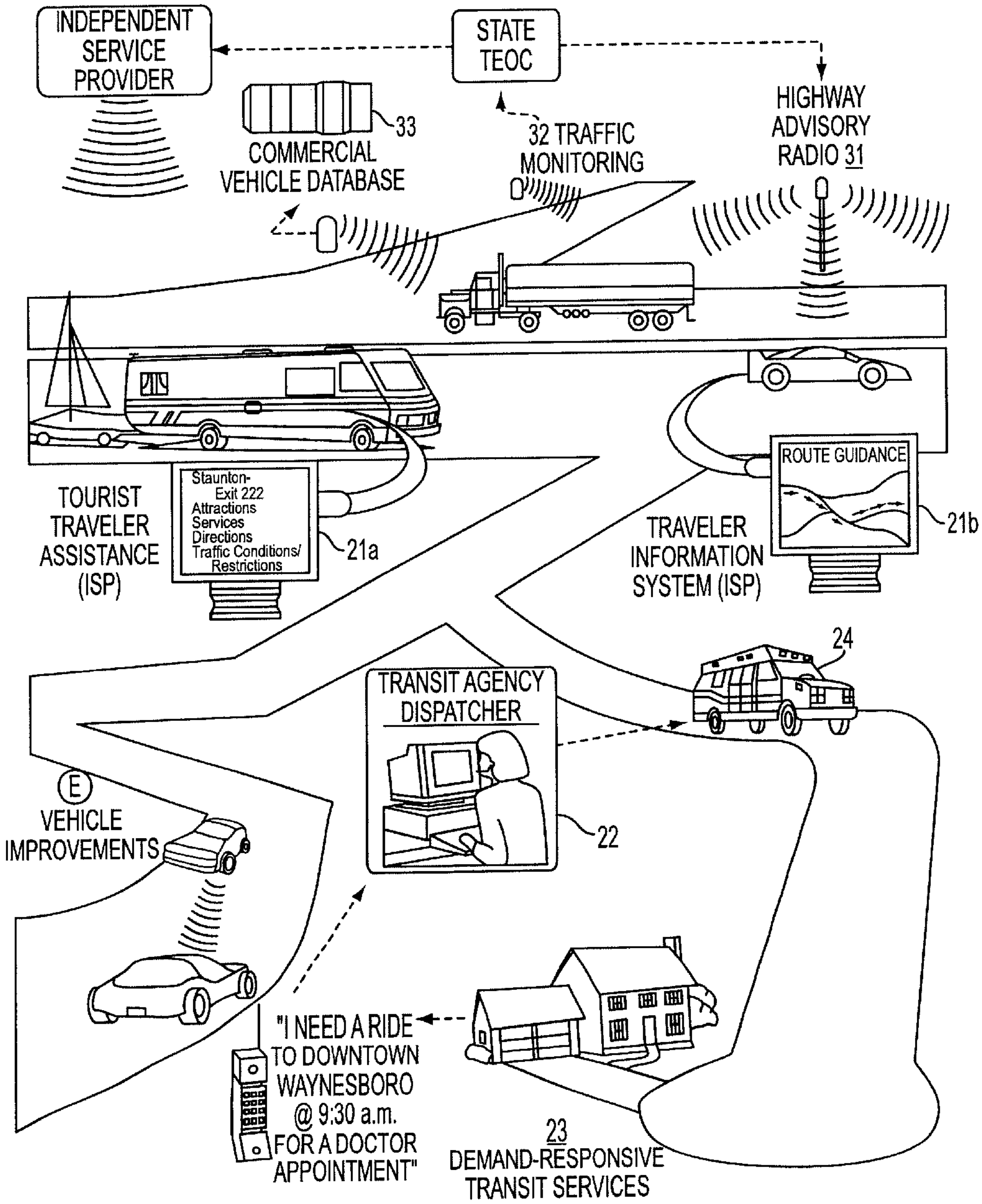
FIG. 5 illustrates travel related services that can be provided to smart card users.

FIG. 5 illustrates additional entertainment and travel-related products and services processors 20. Card reading units 21*a* and 21*b* may be provided such that users can access tourist traveler assistance and traveler information through an Independent service provider. The processors 20 would check for valid smart card 40 identification data (i.e., verification that the user is authorized to access the processors 20) prior to providing the requested products and/or services. As shown in connection with card reading systems 21*a* and 21*b*, the service providers can provide highway advisory radio information 31, traffic monitoring information 32, and commercial vehicle database information 33. The card readers 21*a* and 21*b* may be of the type generally known to those skilled in the art.

By interfacing with multiple types of processors 20, the smart card 40 can perform such functions as paying for bus and airline fares and parking fees and providing paperless receipts.

Phone connection 23 illustrates the use of the smart card 40 to notify a transit agency dispatcher 22 that a ride is required. Transit agency dispatcher 22 dispatches vehicle 24 to the appropriate location.

The smart card 40 can further be used to interface with an entertainment processor that allows payment of usage fees or entry fees for an amusement or theme park. Preferably, through insertion into a card reader associated with a computer and interaction with processors over the Internet, the smart card 40 allows for reading and downloading of smart card 40 account records online. The Internet connection also allows for adding cash, credit or debit value to the smart card 40. Furthermore, through Internet interaction, the smart card 40 can access technical support and travel information regarding roads, weather, airlines, and flights. Additional functionality can be provided by allowing smart card 40 to be used over the Internet to purchase goods and services of company clients from the smart card 40 provider web site and to purchase goods and services from companies linked to the smart card 40 provider's web site. Additional functionality can include the ability to receive general smart card 40 information and the sending of electronic mail to the smart card 40 company and its linked partners. Alternatively, the smart card 40 can be inserted into a suitable wireless device having a smart card reader and enabling Internet access.

The aforementioned objectives may be achieved through provision of a variety of software packages for use in connection with external processors 20, 60 and 80. A first software package includes a set of wireless communication functions allowing for two-way vehicle communication capabilities, wireless network access and messaging, integration of a phone with a vehicle dashboard computer function and inter-vehicle communication. The wireless communication software package may further comprise an operating system for a vehicle dashboard computer and integration of a CD-ROM with appropriate electronic subsystems.

A second software package that may be used in conjunction with the smart card 40 is a map package that provides enhancements to vehicle dashboard navigation systems. The map package can provide capability to receive real time data from RF towers, roadside sensors, satellites, and other computers. The map package can further provide capability to communicate real time or stored data via audio or audiovisual means. The package may also provide a hand help map navigation system for use by non-drivers.

A third software package may be provided for enhancing vehicle dashboard vehicle diagnostics. This package can help avoid vehicle break downs by enabling systems check-ups. It can further provide insurance and vehicle sales related records messaging.

Finally, payment processing software may be provided for facilitating automatic payment. This software is described below in accordance with the method of the invention.

Figure 6:
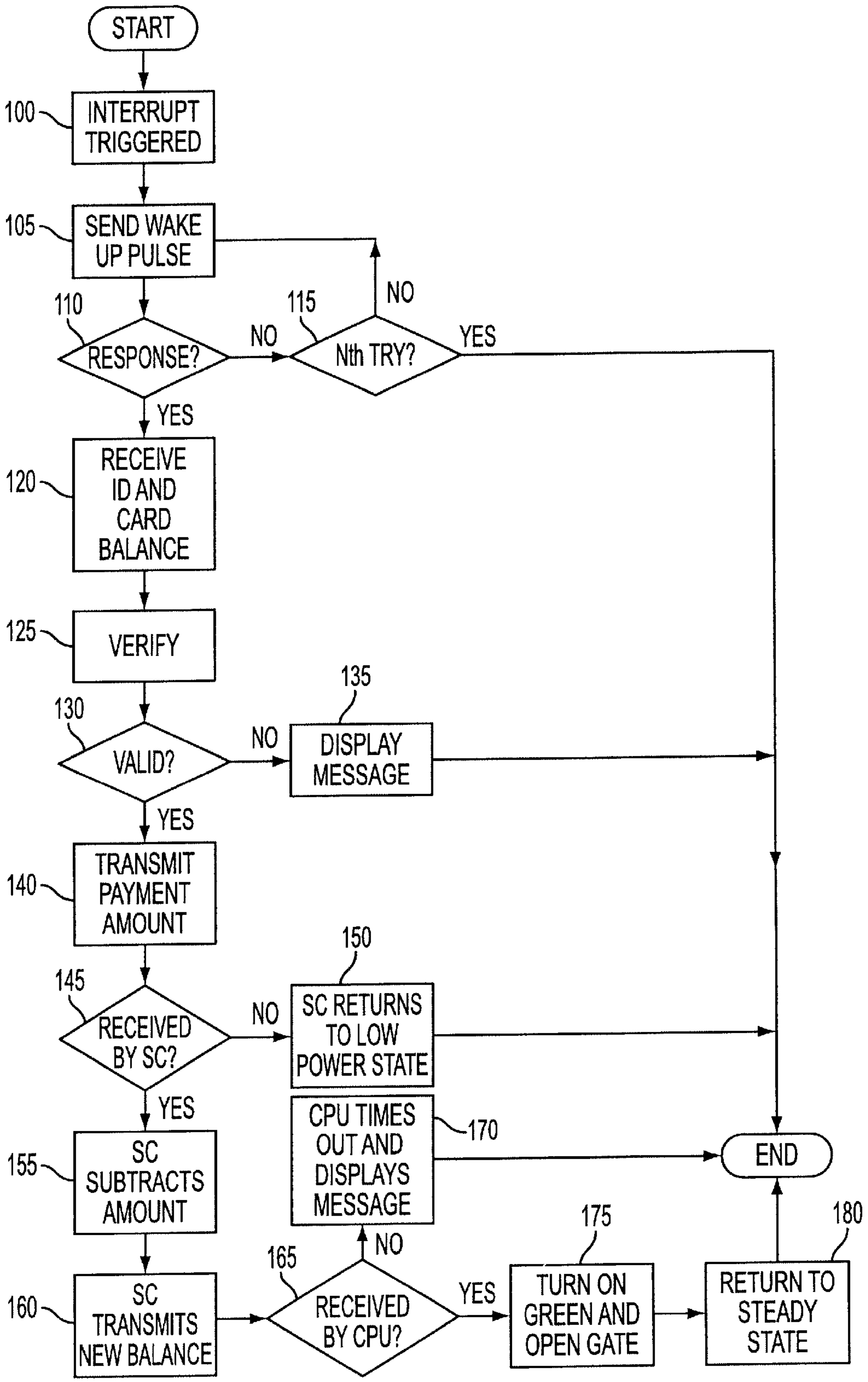
FIG. 6 is a flow chart illustrating a method of collecting payments according to one embodiment of the invention.

A method of collecting payments in accordance with the smart card system 10 of the invention is depicted in FIG. 6. The method of collecting payments as depicted in FIG. 6 employs the smart card 40 and payment system 60 shown in FIGS. 2 and 3, respectively.

In a steady state, prior to payment, the smart card 40 is in a low power state. The payment processor 60 is in a wait state. A photodetector beam emanates across the path of oncoming vehicles and is associated with the payment processor 60. The facility 71 as depicted in FIG. 4 is a toll gate and is in a down position and a red light is illuminated.

The method of collecting payments begins when a vehicle interrupts the photodetector beam. The interruption of the photodetector beam triggers an interrupt in the payment processor 60 in step 100. The interrupt causes the payment processor 60 to send a wake up pulse to smart card 40 in step 105. The payment processor 60 waits for a response from the smart card 40 and checks for the response in step 110. If no response is detected in step 110, the processor 60 will return to step 105 and continue to send wake up pulses until a predetermined number of pulses has been sent in step 115. When the predetermined number of pulses has been sent and no response has been received from the smart card 40, the processor 60 displays an appropriate message and ends the payment process.

If in step 110, a response is detected, it is received in step 120 and should correspond to an identification number. In step 125, the payment system 60 attempts to verify the identification number and balance. If verified in step 130, a signal containing data related to the amount of the payment is transmitted to the smart card 40 in step 140. If the identification information provided by the smart card 40 is determined to be invalid in step 130, a corresponding message is displayed in step 135, which preferably instructs the vehicle to pull out of the lane. The payment process then ends when the vehicle pulls out of the lane.

If the identification information is determined to be valid in step 130, the signal including the payment amount is transmitted to the smart card 40 in step 140. If the payment amount is not received by the smart card 40 in step 145, it returns to a low power state in step 150. If the payment amount is received by the smart card 40 in step 145, the payment amount is subtracted from the stored value balance on the smart card 40 in step 155 and the smart card 40 sends its new balance to the payment processor 60 in step 160. If the new balance signal is not received by the payment processor in step 165, payment processor 60 times out in step 170 and displays an appropriate message. If the new balance, or in the alternative a verification signal, is received by the payment processor 60 in step 165, the green light is turned on and the gate is opened in step 175. In step 180, the system 60 returns to a steady state.

It will be apparent to those skilled in the art that various modifications and variations can be made in the system and method of the present invention without departing from the spirit and scope of the invention. Thus, it is intended that the present invention cover the modifications and variations of this invention provided that they come within the scope of the appended claims and their equivalents.

What is claimed is:

1. A multi-purpose smart card system for interactively performing at least one of financial, travel-and entertainment-related functions, the system comprising:

a smart card automated payment means disposed on a smart card for providing automated payment of at least one of a purchase price, fees, fares and tolls;

automated payment means within a payment facility for communicating with the smart card automated payment means to facilitate payment, said payment facility associated with at least one of a toll booth, and a network or Internet site;

storage means on the smart card and/or at least one smart card host system for storing such data as user identification, available funds, and card transaction information;

processing means for updating funds information on the smart card and the at least one smart card host system; and information reading and writing means in the smart card system for interfacing and communicating, based on information stored in the smart card and/or the at least one smart card host system, with:

an authorized network or Internet site wherein at least one of financial, travel, and entertainment account records and related information may be accessed and/or downloaded, the authorized network or Internet site being determined based on valid smart card identification data;

a transportation network or Internet site providing at least one of commercial fleet management, traffic monitoring, and highway advisory information;

a traveler assistance network or Internet site providing at least one of tourist traveler assistance and general traveler information regarding attractions, services, directions, route guidance, and traffic conditions and restrictions;

an authorized funds management network or Internet site wherein cash, credit, or debit value may be added to the smart card, the authorized funds management network or Internet site being determined based on valid smart card identification data;

an information network or Internet site for receiving and sending electronic mail and messages by a user and/or host of the smart card;

a purchasing network or Internet site for purchasing goods and services of companies and organizations; and a telephony network or Internet site for accessing information services.

2. The multi-purpose smart card system of claim 1, wherein the smart card automated payment means and the automated payment means within the payment facility comprise a contactless payment means.

3. The multi-purpose smart card system of claim 2, wherein the contactless payment means comprises light emitting diodes and phototransistors.

4. The multi-purpose smart card system of claim 2, wherein the information reading and writing means and the payment means within the smart card are provided on a single chip.

5. The multi-purpose smart card system of claim 2, wherein the information reading and writing means and the payment means within the smart card are provided on two separate chips.

6. The multi-purpose smart card system of claim 1, wherein the smart card automated payment means and the automated payment means within the payment facility comprise a contact payment means.

7. The multi-purpose smart card system of claim 1, wherein the information reading and writing means comprises a magnetic stripe.

8. The multi-purpose smart card system of claim 1, wherein the storage means comprises an electrically erasable programmable read only memory.

9. The multi-purpose smart card system of claim 1, wherein the traveler assistance network or Internet site further provides travel information including at least one of road conditions, weather conditions, and airline schedules.

10. The multi-purpose smart card system of claim 1, wherein the information reading and writing means further comprises means for changing a monetary value on the smart card.

11. The multi-purpose smart card system of claim 10, wherein the means for changing the monetary value comprises means for adding a cash, credit or debit value to the smart card.

12. The multi-purpose smart card system of claim 1, wherein the information reading and writing means further comprises means for providing access to technical and customer support.

13. The multi-purpose smart card system of claim 1, wherein the storage means stores card transaction information.

14. The multi-purpose smart card system of claim 1, wherein the smart card comprises further means for wireless communication.

15. The multi-purpose smart card system of claim 1, wherein the information reading and writing means comprises contact means for interfacing and communicating through the use of a card reader.

16. The multi-purpose smart card system of claim 1, wherein the information reading and writing means further interfaces and communicates with a vehicle diagnostics network or Internet site for providing systems check-ups and vehicle-related messaging.

17. A multi-purpose smart card for communicating with a payment central processing unit for facilitating automatic payment of at least one of a purchase price, fees, fares and tolls, the smart card comprising:

receiving means for receiving a wakeup signal and a payment amount from the payment central processing unit;

storage means for storing such data as user identification data and financial data;

information reading and writing means for transmitting a user identification number and a card balance upon receipt of the wakeup signal, and for communicating with:

an authorized network or Internet site wherein at least one of financial, travel, and entertainment account records and related information may be accessed and/or downloaded, the authorized network or Internet site being determined based on valid smart card identification data;

a transportation network or Internet site providing at least one of commercial fleet management, traffic monitoring, and highway advisory information;

a traveler assistance network or Internet site providing at least one of tourist traveler assistance and general traveler information regarding attractions, services, directions, route guidance, and traffic conditions and restrictions;

an authorized funds management network or Internet site wherein cash, credit, or debit value may be added to the smart card, the authorized funds management network or Internet site being determined based on valid smart card identification data;

an information network or Internet site for receiving and sending electronic mail and messages by a user and/or host of the smart card;

a purchasing network or Internet site for purchasing goods and services of companies and organizations; and a telephony network or Internet site for accessing information services;

processing means for processing the payment amount transmitted by the payment central processing unit.

18. The multi-purpose smart card of claim 17, wherein the storage means comprises an electrically erasable programmable read only memory.

19. The multi-purpose smart card of claim 17, wherein the information reading and writing means comprise contactless means.

20. The multi-purpose smart card of claim 17, wherein the information reading and writing means comprise contact means.

21. The multi-purpose smart card of claim 17, wherein the storage means additionally stores card transaction data.

22. A multi-purpose smart card toll payment system comprising:

a central toll payment processing unit, wherein in a steady state, the central toll payment processing unit emits a signal, the signal maintaining a steady state comprising a red light being illuminated and a toll gate being closed, the central toll payment processing unit including infrared transmission means; and a smart card positioned within a vehicle that interrupts the signal, the smart card including storage means for storing such data as user identification and account balance data, processing means for updating account balance data, and contact and/or contactless transmission and reception means for communicating with the central toll payment processing unit and for communicating with:

an authorized network or Internet site wherein at least one of financial, travel, and entertainment account records and related information may be accessed and/or downloaded, the authorized network or Internet site being determined based on valid smart card identification data;

a transportation network or Internet site providing at least one of commercial fleet management, traffic monitoring, and highway advisory information;

a traveler assistance network or Internet site providing at least one of tourist traveler assistance and general traveler information regarding attractions, services, directions, route guidance, and traffic conditions and restrictions;

an authorized funds management network or Internet site wherein cash, credit, or debit value may be added to the smart card, the authorized funds management network or Internet site being based on valid smart card identification data;

an information network or Internet site for receiving and sending electronic mail and messages by a user and/or host of the smart card;

a purchasing network or Internet site for purchasing goods and services of companies and organizations; and a telephony network or Internet site for accessing information services;

wherein, upon triggering of an interrupt, the central payment processing unit wakes up the smart card, receives smart card data, sends a payment amount, and when the payment amount is satisfied, activates a green light and raises the toll gate.

23. The multi-purpose smart card system of claim 22, wherein the signal is an infrared signal, such that the vehicle interrupts a photodetector beam.

24. The smart card system of claim 22, wherein the signal is a radio frequency signal.

25. A multi-purpose smart card system for performing at least one of financial, travel- and entertainment-related functions, the system comprising:

a smart card automated, payment means within a smart card for providing for payment of at least one of a purchase price, fares, fees and tolls for the financial, travel- and entertainment-related functions;

an automated payment facility for communicating with the smart card automated payment means to facilitate automated payment;

storage means on the smart card and/or its host system for storing such data as user identification, available funds and card transaction information;

information reading and writing means in the smart card system for interfacing with:

an authorized network or Internet site wherein at least one of financial, travel, and entertainment account records and related information may be accessed and/or downloaded, the authorized network or Internet site being determined based on valid smart card identification data;

a transportation network or Internet site providing at least one of commercial fleet management, traffic monitoring, and highway advisory information;

a traveler assistance network or Internet site providing at least one of tourist traveler assistance and general traveler information regarding attractions, services, directions, route guidance, and traffic conditions and restrictions;

an authorized funds management network or Internet site wherein cash, credit, or debit value may be added to the smart card, the authorized funds management network or Internet site being determined based on valid smart card identification data;

an information network or Internet site for receiving and sending electronic mail and messages by a user and/or host of the smart card;

a purchasing network or Internet site for purchasing goods and services of companies and organizations; and a telephony network or Internet site for accessing information services; and processing means in the smart card system for updating financial information on the smart card and a smart card host system, wherein the smart card automated payment means includes contactless payment means and/or contact payment means for collecting payments for airlines, buses and other travel- and entertainment-related functions.

26. A method for collecting payments of at least one of a purchase price, fares, fees and tolls with a payment system comprising a smart card and a payment facility processing unit, the method comprising the steps of:

creating a steady state condition in which the smart card is in a low power state, the payment facility processing unit is in a wait state and wherein when a photodetector beam is emitted, a red light is activated and a gate is down;

triggering an interrupt when a vehicle breaks the emitted photodetector beam;

transmitting a signal from the payment facility processing unit to the smart card to wake up the smart card;

transmitting identification and balance information from a contactless and/or contact communication means on the smart card to the payment facility processing unit;

processing the transmitted information and assessing a payment amount;

transmitting the payment amount to the smart card;

subtracting the payment amount from an initial amount stored within the smart card;

transmitting a verification signal from the contactless and/or contact communication means on the smart card to the payment facility processing unit;

activating a green light and raising the gate upon receiving the verification signal at the payment facility processing unit; and using the smart card to perform:

adding cash, credit, or debit value to the smart card by interfacing with an authorized funds management network or Internet site wherein cash, credit, or debit value may be added to the smart card, the authorized funds management network or Internet site being determined based on valid smart card identification data;

accessing and/or downloading at least one of financial, travel, and entertainment account records and related information by interfacing with an authorized network or Internet site, the authorized network or Internet site being determined based on valid smart card identification data;

obtaining at least one of commercial fleet management, traffic monitoring, and highway advisory information by interfacing with a transportation network or Internet site;

obtaining at least one of tourist traveler assistance and general traveler information regarding attractions, services, directions, route guidance, and traffic conditions and restrictions by interfacing with a traveler assistance network or Internet site;

receiving and sending electronic mail and messages by a user and/or host of the smart card by interfacing with an information network or Internet site;

purchasing goods and services of companies and organizations by interfacing with a purchasing network or Internet site;

and accessing information services by interfacing with a telephony network or Internet site.

27. The multi-purpose smart card system of claim 1, further comprising processing means for processing at least one of financial, travel, and entertainment payment records.

28. A method for collecting payments of at least one of a purchase price, fares, fees and tolls with a payment system comprising a smart card and a payment facility processing unit, the method comprising the steps of-creating a steady state condition in which the smart card is in a low power state, the payment facility processing unit is in a wait state;

transmitting a signal from the payment facility processing unit to the smart card to wake up the smart card;

transmitting identification and balance information from a contactless and/or contact communication means on the smart card to the payment facility processing unit;

processing the transmitted information and assessing a payment amount;

transmitting the payment amount to the smart card;

subtracting the payment amount from an initial amount stored within the smart card; transmitting a verification signal from the contactless and/or communication means on the smart card to the payment facility processing unit; and using the smart card to perform:

adding cash, credit, or debit value to the smart card by interfacing with an authorized funds management network or Internet site wherein cash, credit, or debit value may be added to the smart card, the authorized funds management network or Internet site being determined based on valid smart card identification data;

accessing and/or downloading at least one of financial, travel, and entertainment account records and related information by interfacing with an authorized network or Internet site, the authorized network or Internet site being determined based on valid smart card identification;data;

obtaining at least one of commercial fleet management, traffic monitoring, and highway advisory information by interfacing with a transportation network or Internet site;

obtaining at least one of tourist traveler assistance and general traveler information regarding attractions, services, directions, route guidance, and traffic conditions and restrictions by interfacing with a traveler assistance network or Internet site;

receiving and sending electronic mail and messages by a user and/or host of the smart card by interfacing with an information network or Internet site;

purchasing goods and services of companies and organizations by interfacing with a purchasing network or Internet site; and accessing information services by interfacing with a telephony network or Internet site.

* * * * *